US005968235A

United States Patent [19]
Grime et al.

[11] Patent Number: 5,968,235
[45] Date of Patent: *Oct. 19, 1999

[54] METHOD FOR VOC ABATEMENT

[75] Inventors: Thomas E. Grime, Temperance, Mich.; Andrew P. Gargac, Oregon, Ohio; Larry E. Campbell, Louisville, Tenn.

[73] Assignee: Ransburg Corporation, Indianapolis, Ind.

[*] Notice: This patent is subject to a terminal disclaimer.

[21] Appl. No.: 09/146,988

[22] Filed: Sep. 3, 1998

Related U.S. Application Data

[63] Continuation of application No. 08/815,333, Mar. 10, 1997, Pat. No. 5,814,132, which is a continuation of application No. 08/509,423, Jul. 31, 1995, abandoned.

[51] Int. Cl.[6] .................................................. B01D 53/04
[52] U.S. Cl. ................................................ 95/123; 95/143
[58] Field of Search .......................... 95/117–123, 141, 95/143, 148; 96/135, 136, 143–145, 153; 55/DIG. 46

[56] References Cited

U.S. PATENT DOCUMENTS

| | | | |
|---|---|---|---|
| 1,382,889 | 6/1921 | Burrell et al. | 95/141 X |
| 1,418,363 | 6/1922 | Coggeshall et al. | 95/141 X |
| 2,293,901 | 8/1942 | Hutchinson | 95/23 |
| 3,395,972 | 8/1968 | Hardison | 23/4 |
| 3,713,272 | 1/1973 | Barrere, Jr. et al. | 95/143 X |
| 3,750,622 | 8/1973 | Repp et al. | 118/326 |
| 4,261,707 | 4/1981 | Bradshaw et al. | 55/48 |
| 4,265,642 | 5/1981 | Mir et al. | 55/85 |
| 4,266,504 | 5/1981 | Roesner | 118/663 |
| 4,289,505 | 9/1981 | Hardison et al. | 95/141 |
| 4,313,015 | 1/1982 | Broughton | 95/147 X |
| 4,313,369 | 2/1982 | Tsuruta et al. | 98/115 SB |
| 4,323,372 | 4/1982 | Bentz et al. | 95/141 |
| 4,351,863 | 9/1982 | Roesner | 427/421 |
| 4,353,715 | 10/1982 | Mir et al. | 55/22 |
| 4,377,396 | 3/1983 | Krauss et al. | 95/141 |
| 4,378,235 | 3/1983 | Cosper et al. | 55/85 |
| 4,396,405 | 8/1983 | Lindenberger et al. | 55/85 |
| 4,409,006 | 10/1983 | Mattia | 95/141 X |
| 4,448,812 | 5/1984 | Lauke | 427/377 |

(List continued on next page.)

FOREIGN PATENT DOCUMENTS

| | | | |
|---|---|---|---|
| 0023054 | 1/1991 | European Pat. Off. | 95/141 |
| 4319895 | 12/1994 | Germany | 95/141 |
| 56-113321 | 9/1981 | Japan | 95/141 |
| 0899097 | 1/1982 | U.S.S.R. | 95/141 |
| 1139483 | 2/1985 | U.S.S.R. | 95/123 |
| 1472084 | 4/1989 | U.S.S.R. | 95/141 |
| WO 93/03820 | 3/1993 | WIPO | 95/141 |

OTHER PUBLICATIONS

"Zeolites for VOC Abatement", Derrick Crohan, Industrial Finishing, Mar., 1993, pp. 35–37.
"Hydrophobic Zeolites for VOC Abatement", Lars Falth, Munter Zeol (undated).
"Advanced Rotor Concentrators Using Hydrophobic Zeolite", Jesper Gronvaldt, Munster Zeol (undated).
"Sorbead Desiccants/Adsorbents", Kali–Chemie Corporation, Dec., 1988.
"A Catalytic Oxidation System for Volatile Organic Compound Abatement", Advanced Catalyst Systems (undated).

*Primary Examiner*—Robert Spitzer
*Attorney, Agent, or Firm*—MacMillan, Sobanski & Todd, LLC

[57] ABSTRACT

A VOC (volatile organic compounds) adsorbent material is treated with a masking agent to reduce its affinity for VOC's to a level that the material can be regenerated at a predetermined low temperature which will not desorb the masking agent. Preferably, the adsorbent material is a water adsorbent desiccant which is treated with water vapor. The treated adsorbent material is used to adsorb VOC's from gas and is periodically regenerated with heated air. The desorbed VOC's may be destroyed by oxidizing, for example, with a catalyst.

1 Claim, 3 Drawing Sheets

U.S. PATENT DOCUMENTS

| | | | |
|---|---|---|---|
| 4,480,393 | 11/1984 | Flink et al. | 95/148 X |
| 4,519,816 | 5/1985 | Clarke | 55/59 |
| 4,537,120 | 8/1985 | Josefsson | 98/115.2 |
| 4,563,199 | 1/1986 | Lindenberger et al. | 55/85 |
| 4,565,553 | 1/1986 | Nowack | 55/59 |
| 4,587,927 | 5/1986 | Beierling et al. | 118/326 |
| 4,664,061 | 5/1987 | Morioka et al. | 118/663 |
| 4,687,686 | 8/1987 | Stofleth et al. | 427/421 |
| 4,750,412 | 6/1988 | Itou | 98/115.2 |
| 4,820,318 | 4/1989 | Chang et al. | 95/141 |
| 4,844,721 | 7/1989 | Cox et al. | 55/85 |
| 4,966,611 | 10/1990 | Schumacher et al. | 95/141 X |
| 4,986,836 | 1/1991 | Tandon | 55/161 |
| 5,019,138 | 5/1991 | Farrah et al. | 55/89 |
| 5,023,116 | 6/1991 | Williams et al. | 427/424 |
| 5,039,313 | 8/1991 | Gocht | 55/8 |
| 5,113,600 | 5/1992 | Telchuk | 34/90 |
| 5,114,591 | 5/1992 | Patzelt et al. | 210/663 |
| 5,127,574 | 7/1992 | Mosser et al. | 236/44 R |
| 5,133,246 | 7/1992 | Campbell | 454/52 |
| 5,133,690 | 7/1992 | Bowe | 454/51 |
| 5,137,548 | 8/1992 | Grenier et al. | 95/123 X |
| 5,163,980 | 11/1992 | Kovach | 95/141 X |
| 5,165,969 | 11/1992 | Barlett et al. | 427/421 |
| 5,198,001 | 3/1993 | Knebel et al. | 55/28 |
| 5,220,796 | 6/1993 | Kearns | 95/123 X |
| 5,221,230 | 6/1993 | Darvin et al. | 454/53 |
| 5,223,141 | 6/1993 | Brown et al. | 210/634 |
| 5,256,173 | 10/1993 | Rastelli | 95/141 |
| 5,281,257 | 1/1994 | Harris | 95/147 X |
| 5,308,457 | 5/1994 | Dalla Betta et al. | 204/131 |
| 5,346,535 | 9/1994 | Kuznicki et al. | 95/147 X |
| 5,421,860 | 6/1995 | Bertz et al. | 95/143 X |
| 5,458,784 | 10/1995 | Baker et al. | 95/141 X |
| 5,814,132 | 9/1998 | Grime et al. | 95/123 |

METHOD FOR VOC ABATEMENT

CROSS REFERENCE TO RELATED APPLICATIONS

This is a continuation of application Ser. No. 08/815,333 filed Mar. 10, 1997, which is a continuation of application Ser. No. 08/509,423 filed Jul. 31, 1995, now abandoned.

TECHNICAL FIELD

The invention relates to VOC (volatile organic compounds) abatement and more particularly to an improved method for abating VOC emissions from sources such as paint spray booths.

BACKGROUND ART

Governments have become increasingly concerned with and have increasingly regulated the emissions of VOC's such as organic paint and adhesive solvents and organic fabric dry cleaning solvents. Typical organic paint solvents include MEK, xylene, toluene, isopropyl alcohol and lacquer thinner. Two methods have been used in the past to abate the discharge into the atmosphere of VOC emissions from paint spray booths. According to one method, at least a portion of the air circulated through a paint spray booth is withdrawn and passed through a burner which incinerates the VOC's. Direct incineration of the VOC's can consume a large amount of energy, since the exhausted air must be heated to approximately 1500° F. to 1700° F. (815° C. to 925° C.) during the entire time that the VOC's are emitted. Further, in colder climates it may be necessary to heat a large amount of make up air which must be supplied to the spray booth to replace the exhausted air.

A second VOC abatement method involves collection of the VOC's in a filter bed, such as a charcoal filter bed. However, the filter bed either must be frequently replaced and properly disposed of or must be periodically regenerated by desorbing the accumulated VOC's. A charcoal filter bed requires about 600° F. (about 315° C.) for regeneration. When a charcoal filter bed is used for collecting VOC's, there is a risk that an exothermic reaction can occur, creating sufficient heat to cause combustion. It also is known that certain adsorbent materials such as zeolite have a high molecular affinity for VOC's and other vapors and gases, and may be used as a filter material for separating components of a gaseous mixture. A zeolite filter typically requires heating to about 300° F. to 350° F. (about 150° C. to 175° C.), or more, for regeneration. Because of the intense heat required for regeneration, it was necessary to transfer a carbon filter bed or a zeolite filter bed from the adsorption location in a spray booth to a separate furnace for regeneration. Separate heat sources were required for heating the paint in the spray booth to cure the applied paint and for regenerating the filter.

It also is known that VOC's can be eliminated from a gas stream by oxidation without reaching the combustion temperature. The VOC vapor in a gas stream can be oxidized by heating and contacting with a catalyst such as platinum. Typically, the catalyst is coated on a porous substrate, such as a ceramic honeycomb or foam, which provides a very large surface area for contact with the gas. Both catalytic oxidation and incineration are effective to reduce the emitted VOC's to carbon dioxide and water before the exhaust gas is released to the atmosphere.

Spray booths are generally used, for example, in commercial shops which repaint vehicles, in order to confine paint overspray and to evacuate VOC's released during painting. Generally, the spray booth air has been exhausted to the atmosphere. Filtered spray booth air has been recirculated back to the booth only when the booth is unmanned. Preferably, a high flow of air is passed through the spray booth filtered during painting in order to maintain clean filtered air inside the spray booth to reduce the risk of paint overspray, dust and environmental contaminants from outside the booth from contacting and damaging the wet finish. The exhausted booth air is easily filtered to remove particulate overspray. However, the highest level of VOC's are released during and immediately after the paint spraying operation. The booth air could not be recirculated during spraying in a manned booth since the painter would be subjected to an increasing VOC vapor level in the booth as painting progresses. If the spray booth air is exhausted to the atmosphere, a large quantity of clean, warm make up air is required. In colder climates, the make up air often needs to be heated. Preferably, the spray booth air is maintained at about 70° F. (21° C.) during painting and the booth temperature may be increased significantly during the drying and baking stage. For example, the painted surfaces and the booth air may be heated to reach about 140° F. to 180° F. (60° C. to 82° C.) during drying. A paint spray booth of a sufficient size for enclosing a vehicle may have an air flow rate on the order of 10,000 cubic feet per minute (283 cubic meters per minute). To exhaust this amount of air from the booth and replace it with clean, warm make up air can consume a large amount of energy in addition to the energy required for removing the VOC's from the exhausted air. This adds significantly to the cost of painting a vehicle. Ideally, any particulates such as paint overspray and the VOC's is filtered or otherwise separated from the warm spray booth air and the warm filtered air is then returned to the booth.

DISCLOSURE OF INVENTION

The present invention is directed to a method for VOC abatement and to a paint spray booth incorporating the method. Desiccants have been used in the past for separating water vapor from gases. It has been observed that one property of desiccant is that it has a molecular attraction both for water vapor and for VOC's. For at least some desiccants such as alumino-silicate gels, the attraction for VOC's is less than the attraction for water vapor. A higher temperature is required during regeneration to drive off previously adsorbed water vapor than to drive off adsorbed VOC's. Another property of these desiccants is that when they are saturated with adsorbed materials, regeneration takes place over a range of temperatures. Some of the adsorbed material will be released at a lower temperature than the remainder of the adsorbed material. It has been discovered that as at least some desiccants adsorb water vapor, their VOC attraction is reduced. At the same time, the regeneration temperature required to release the molecular attraction for adsorbed VOC's is reduced.

According to the invention, a VOC adsorbent desiccant or other suitable material is treated with a vapor which has a stronger molecular attraction to the adsorbent material than to subsequently adsorbed VOC's in order to lower the VOC regeneration temperature to a desired temperature. Preferably, the adsorbent material is a desiccant such as an alumino-silicate gel in the form of hard generally spherical beads treated with sufficient water vapor to reduce the VOC regeneration temperature to about 140° F. to 180° F. (60° C. to 82° C.). The desiccant will require heating to a higher temperature, such as within the range of about 250° F. to 400° F. (120° C. to 205° C.) to completely eliminate the adsorbed water vapor. As a consequence of the water vapor treatment, the desiccant may lose about 80% to 90% of its VOC adsorption capability. The treated adsorbent material is used, for example, to adsorb VOC's in air which is circulated from a spray booth through the adsorbent material and is returned to the spray booth or is exhausted during a painting operation. All of the air withdrawn from the spray booth is filtered and passed through a VOC adsorption bed prior to returning the clean air to the spray booth or is exhausted to atmosphere. As a consequence of this process, an operator may remain in the recirculated air spray booth during spraying. This differs from the prior art recirculated air spray booths which could not be manned during spraying due to the VOC level in the spray booth air.

Preferably, the spray booth also is used to hold a freshly sprayed workpiece while the applied coating is cured. Curing is enhanced by heating the air circulated through the spray booth to about 140° F. to 180° F. (60° C. to 82° C.). After spraying, the operator leaves the spray booth and the booth air is heated by passing a portion of the filtered recirculated air through a burner to heat such air portion to a high temperature. At least a portion of the heated air is mixed with the remaining recirculated air and any makeup air and returned to the booth. Mixing is controlled to achieve a desired booth temperature, e.g., about 140° F. to 180° F. (60° C. to 82° C.). During the heated paint curing cycle, the heated booth air is drawn through and regenerates the filter material by causing the adsorbed VOC's to be released. The desorbed VOC's are then oxidized either through incineration or, preferably, by contacting the hot gas with a catalyst immediately downstream from the burner. The hot effluent from the catalyst is returned to the booth, as needed, to maintain the booth temperature, and the remainder is discharged to atmosphere. Filtered make up air is provided to the booth, as needed, to compensate for the catalyst effluent discharged to the atmosphere.

Accordingly, it is an object of the invention to provide a method and apparatus for removing VOC's from air.

Other objects and advantages of the invention will become apparent from the following detailed description of the invention and the accompanying drawings.

BEST MODE FOR CARRYING OUT THE INVENTION

The invention is directed to a method for the abatement of VOC's through the use of a treated adsorbent material and to the adaptation of the method to the reduction of VOC's in a paint spray booth. It is well known that certain adsorbent materials such as certain desiccants and zeolites have a strong affinity for certain vapors which render such materials useful as an adsorbent for separating such vapors from air. Desiccants such as alumino-silicate, for example, are known for adsorption of water vapor from air and other gases, while certain zeolites and charcoal are known for adsorbing VOC's from air.

Adsorbent materials may be regenerated by heating to a sufficiently high temperature to break the molecular attraction and drive off the adsorbed vapor. The actual temperature required for regeneration will depend on the strength of the molecular attraction between the adsorbent material and the adsorbed vapor. An alumino-silicate gel desiccant, for example, is commonly used as a drying agent for extracting water vapor from gas. This desiccant has a strong molecular attraction for water vapor and may require heating to about 250° F. to 400° F. (120° C. to 205° C.) to fully desorb water vapor. It has been observed that alumino-silicate gel desiccant also will adsorb VOC's and may require heating up to about 350° F. (about 175° C.) or more to fully desorb typical VOC's released in a paint spray booth. Low boiling point hydrocarbons are desorbed at a lower temperature than higher boiling point hydrocarbons. When either water vapor or VOC's are directly adsorbed by a desiccant, a strong dipole bond is formed. A preferred desiccant for adsorbing VOC's is alumino-silicate gel containing about 3% alumna ($Al_2O_3$) and 97% silica ($SiO_2$) in the form of hard, generally spherical beads. Such a desiccant is commercially available, for example, from Kali-Chemie Corporation of Greenwich, Conn. under the trademark "Sorbead R". Other VOC adsorbent materials such as zeolite also may be acceptable alternatives.

Figure 1:
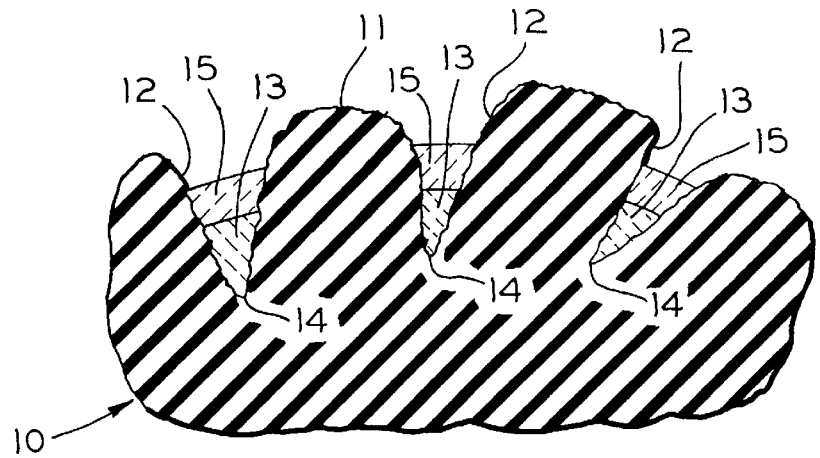
FIG. 1 is a fragmentary diagrammatic view of a portion of a filter material which has been treated with a vapor to reduce its affinity for VOC's.

Desorption from a desiccant takes place over a range of temperatures. The alumino-silicate gel desiccant's molecular attraction for VOC's is strong and the prior adsorption of water Vapor by the desiccant reduces its attraction for VOC's. It has been found that as water vapor is adsorbed, surfaces of the desiccant become loaded or masked with the adsorbed water vapor and the molecular attraction for the VOC's becomes weaker. After the desiccant has adsorbed sufficient water vapor, it has a weak attraction for VOC's. The adsorbed VOC's are much more easily desorbed than the adsorbed water vapor. The reason for this has not been fully understood. FIG. 1 illustrates a highly enlarged fragmentary surface portion of a piece of desiccant 10. The desiccant 10 has an irregular surface 11 which contains crevasses or fissures or micropores 12. The fissures or micropores 12 and other irregularities in the surface 11 provide a large surface area which has a strong molecular attraction for vapors. According to the invention, the desiccant 10 is treated by exposure to a vapor such as steam. Initially, it was believed that the adsorbed water 13 partially filled the fissures or micropores 12 to form a masking agent which covered the areas with the strongest molecular attraction for VOC's. The amount of water or other masking agent 13 adsorbed by the desiccant 10 will depend on the exposure to the steam. The water 13 was believed to be adsorbed at the bottoms 14 of the fissures or micropores 12 where the molecular attraction was believed to be strongest. The desiccant 10 must be heated to the upper end of the regeneration temperature range to fully release this adsorbed water 13. When the water vapor treated desiccant 10 is subsequently exposed to air containing VOC's, it was thought that the VOC's were adsorbed as a layer 15 above the previously adsorbed water 13.

Further evaluation of the water vapor treated desiccant has lead to a different conclusion as to its method of operation. It is now believed that the adsorbed water vapor covers the surfaces of the desiccant with a thin layer of water. It is believed that the VOC's are adsorbed by forming a weak hydrogen bond to the water vapor film on the surfaces of the adsorbent material. The hydrogen bond between the adsorbed water vapor and the VOC's is weaker than the molecular bond which would otherwise be formed between the VOC's and the desiccant. Consequently, the VOC's are desorbed from the treated desiccant at a significantly lower temperature than from an untreated desiccant. For the length of time at the low temperature required to desorb the VOC's, the adsorbed water will not be significantly desorbed.

The hydrogen bond between the water which covers or masks the surfaces of the desiccant and the VOC's is significantly weaker that the bond formed between the VOC's and the untreated desiccant. This has the beneficial effect of reducing the regeneration temperature. However, the trade off is that the treated desiccant 10 is less efficient in adsorbing VOC's than untreated desiccant. The treated desiccant may be perhaps only 10% to 20% as efficient at adsorbing VOC's as untreated desiccant. The actual regeneration temperature will depend on the particular adsorbent material and on the particular VOC's being adsorbed.

A particular paint may contain solvent having several different VOC's with different molecular attractions to the desiccant 10. If the desiccant 10 is sufficiently treated so that the VOC having the strongest molecular attraction is released at 150° F. (66° C.), other adsorbed VOC's may be released at lower temperatures, for example, at only 120° F. (50° C.). Since the desiccant 10 has a stronger molecular attraction for the water 13 than the water has for the VOC's 15, the desorption temperature range for desorbing the water 13 will be significantly higher thin the desorption temperature range for the VOC's 15. Consequently, the desiccant 10 may be used to adsorb VOC's 15 and may be repeatedly regenerated and reused Without affecting the adsorbed water 13. The steam treated alumino-silicate gel desiccant does not appear to be sensitive to moisture in the spray booth air, while the desiccant still retains an affinity for VOC's. The treatment of the desiccant with steam appears to sufficiently load the desiccant that it will not adsorb additional moisture from air at normal spray booth temperatures. During desorption of VOC's, it appears that some excess water also may be desorbed. However, the desiccant remains sufficiently loaded with water to permit easy desorption of subsequently adsorbed VOC's. If the desiccant does adsorb additional water, it will not adversely affect its VOC adsorption, since it appears that the VOC's are adsorbed by bonding to the adsorbed water.

The treated desiccant 10 may be placed in filter beds through which VOC containing air is circulated to separate the VOC's from the air. In the broadest aspects of the invention, the filter bed may be used, for example, in either open front or closed paint spray booths, or for filtering VOC laden air from dry cleaning operations, manufacturing operations, etc. Depending on the application, the desiccant 10 may be regenerated either in situ or by moving the filter beds to a separate furnace (not shown) which heats the desiccant 10 sufficiently to desorb the VOC's 15 without desorbing the water.

Figure 2:
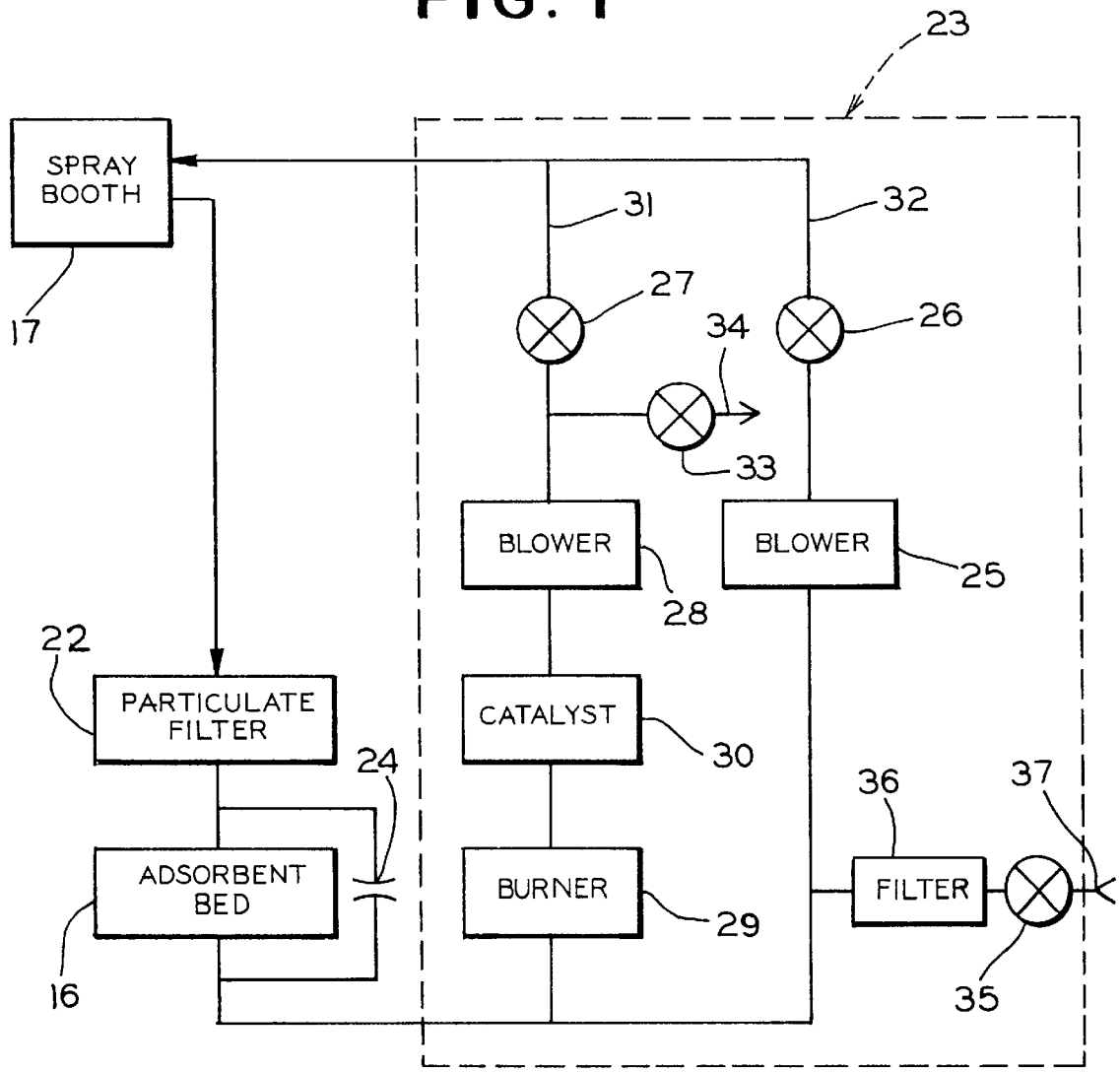
FIG. 2 is a block flow diagram for a paint spraying system according to the invention.
Figure 3:
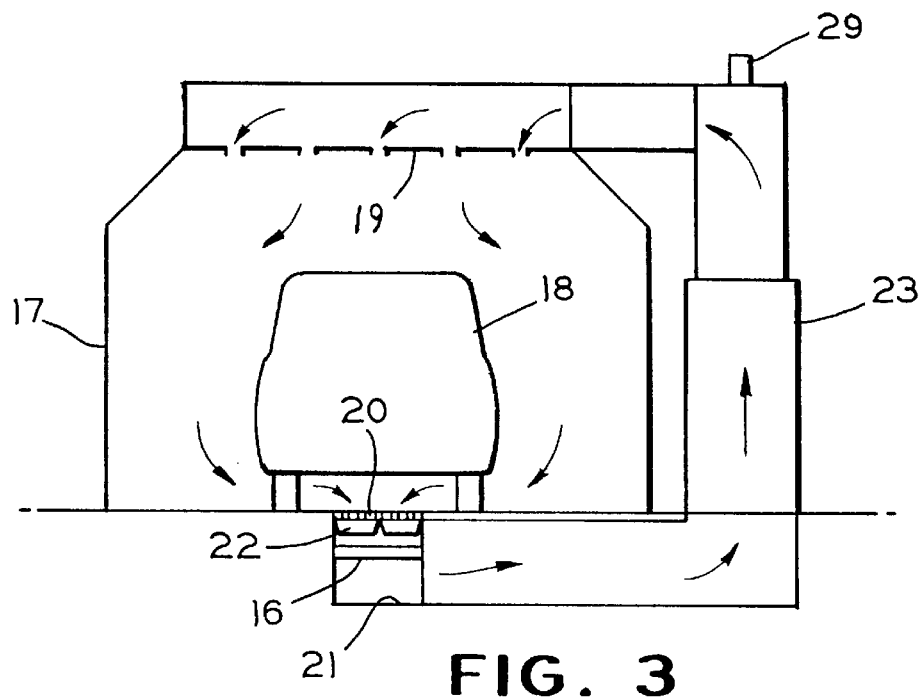
FIG. 3 is a schematic diagram of a paint spraying system according to the invention.
Figure 4:
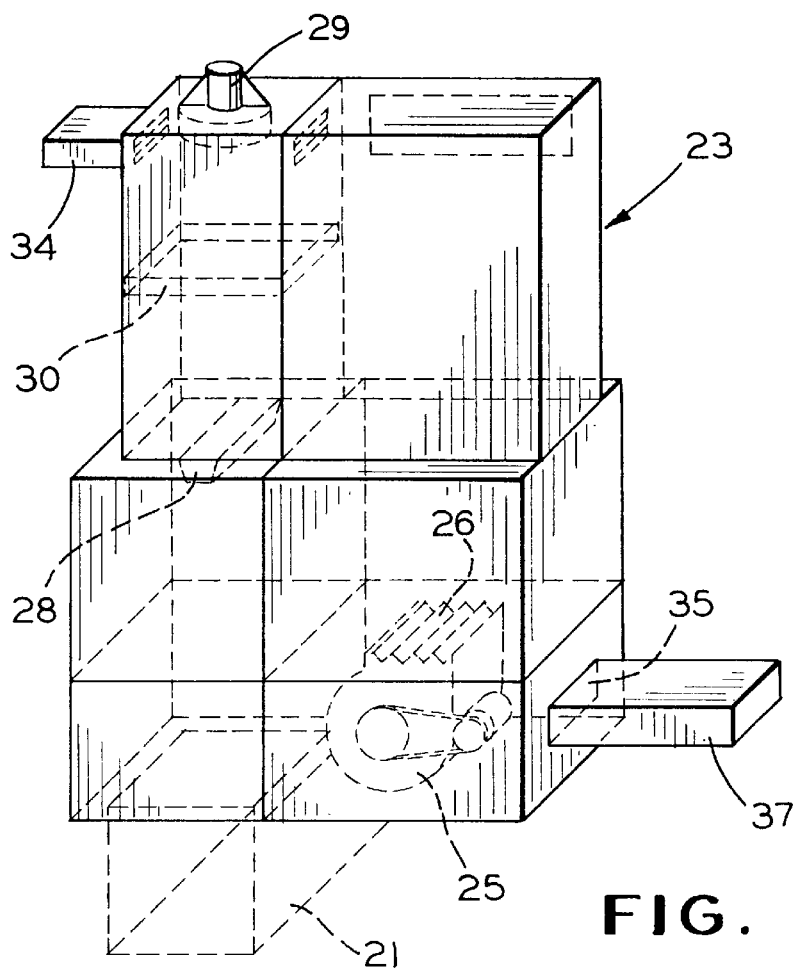
FIG. 4 is a perspective view of the air handling portion of the system of FIG. 3.

FIGS. 2–4 illustrate a treated desiccant adsorbent bed 16 located to filter VOC's from air circulated through i closed paint spray booth 17. The illustrated paint spray booth 17 is of a type suitable for use in an automobile paint refinishing operation wherein paint is sprayed on a vehicle 18 and then, while the vehicle 18 remains in the booth 17, the painted surfaces are heated to about 140° F. to 180° F. (60° C. to 82° C.) to cure the applied paint. VOC's are released into the air in the booth primarily during and immediately following the spray cycle.

FIG. 2 is a block flow diagram of a circuit for removing VOC's from the spray booth 17, which is illustrated in the schematic diagram of FIG. 3. The spray booth 17 is of the downdraft type in which a flow of air is discharged from ducts or a ceiling grid 19 at the top of the booth 17 and air with any entrained paint particles and VOC's is withdrawn through a grid 20 in the floor of the booth 17. The vehicle 18 is positioned over the floor grid 20. A pit 21 is located below the floor grid 20. The VOC adsorbent bed 16 is mounted in the pit 21 and a particle filter 22 is mounted between the adsorbent bed 16 and the grid 20. FIG. 3 represents an end view of the spray booth 17 and of the floor grid 20. The particle filter 22 and the adsorbent bed 16 may extend for substantially the full length of the spray booth 17. The spray booth air is drawn through the floor grid 20, through the particle filter 22 and through the adsorbent bed 16 by an air handling unit 23 and is returned to the spray booth 17 through the ceiling grid 19.

The minimum depth of the adsorbent beds 16 will depend on the operating cycle. As the maximum amount of VOC's which must be adsorbed between regeneration cycles increases, the volume of the beds 16 must increase. It will be appreciated that there will be a pressure drop as the booth air is drawn through the adsorbent bed 16. The adsorbent beds 16 may be a series of trays set on rails or steps (not shown) on the sides of the pit 21. One or more gaps 24 of a desired size may be established between and in parallel with the adsorbent beds 16 to control the air pressure in the spray booth 17. Since the air is recirculated through the spray booth 17, any VOC's entrained in air passing through the gaps 24 will be picked up by the adsorbent bed 16 on a subsequent cycle through the spray booth. The gaps 24 function as a coarse adjustment for reducing the back pressure across the adsorbent beds 16 and may be necessary when a single blower is used to recirculate the spray booth air.

While the vehicle 18 is being sprayed in the spray booth 17, a high capacity blower 25 in the air handling unit 23 draws the booth air through the particulate filter 22 and the adsorbent bed 16 and returns the air through a damper 26 to the spray booth 17. For a spray booth of a size to hold a vehicle 18, the blower may, for example, recirculate on the order of about 10,000 cubic feet per minute (283 cubic meters per minute) of air through the spray booth. Since the air is being filtered to remove both particulates and VOC's and is recirculated, the operation of the spray booth during spraying is energy efficient. It is not necessary to provide large quantities of heated and filtered make up air to the spray booth 17. Air recirculation also reduces the risk of exposing the freshly painted surfaces to contaminants which could damage the finish. Since most VOC's are removed from the recirculated air, a spray gun operator with appropriate respiratory protection may be present in the spray booth during spraying.

After spraying is completed and the spray gun operator leaves the spray booth 17, a damper 27 is opened, a relatively low capacity blower 28 is turned on, and a burner 29 is turned on. The blower 28 may only have a capacity of, for example, about 1,000 cubic feet per minute (28.3 cubic meters per minute), or considerably less than the blower 25. The burner 29, a catalyst 30, the blower 28 and the damper 27 are arranged in a series flow path 31 which is connected in parallel with a flow path 32 which comprises the blower 25 and the damper 26. When the damper 27 is opened and the blower 28 is turned on, the air flow splits between the paths 31 and 32, with the majority of the recirculated air continuing to flow in the path 32. The burner 29 heats the air in the path 31 to a high temperature and the heated air is mixed with the air from the path 32 and returned to the spray booth 17. All of the heated air in the flow path 31 is initially returned to the spray booth 17 while the temperature of the spray booth is raised to the desired cure temperature. By modulating the dampers 26 and 27 after the spray booth air reaches the desired cure temperature, the air mix ratio may be controlled to maintain the temperature in the spray booth 17. Preferably, the air in the booth 17 is heated to a desired temperature on the order of between 140° F. and 180° F. (60° C. to 82° C.) to decrease the paint cure time. However, the actual desired cure temperature may vary with various factors including the properties of the applied finish and the maximum temperature to which the finished workpiece may be exposed.

The desiccant or other VOC adsorbent material in the adsorbent bed 16 is treated, as described above, to have a regeneration temperature for the VOC's at or below the temperature to which the spray booth air is heated during the cure cycle. Consequently, when the spray booth 17 is heated to the desired cure temperature, the previously adsorbed VOC's are released from the adsorbent bed 16 into the recirculated air during paint cure. However, the released VOC's are confined within the closed spray booth system and the operator is not present in the spray booth at this time due to the high temperature. Preferably, the output of the burner 29 is sufficient to heat the air in the path 31 to about 650° F. (345° C.) to activate the catalyst 30 to oxidize the VOC's flowing in the path 31. For oxidizing VOC's from paint, the catalyst may be platinum coated on a porous substrate. The substrate may be, for example, a commercially available open celled ceramic foam having on the order of about 300 cells per cubic inch (about 18.3 cells per cubic centimeter). If the burner 29 heats the air flowing in the path 31 to about 650° F. (345° C.) or more, the platinum catalyst 30 causes the VOC's to oxidize into primarily carbon dioxide and water. When heated sufficiently for activation, an exothermic reaction takes place at the catalyst 30, further raising the temperature of the catalyst 30. A second damper 33 is located after the blower 28, in addition to the damper 27. The damper 33 controls the venting of gas in the flow path 31 through an exhaust duct 34 to atmosphere outside of the spray booth 17. After the spray booth 17 is heated to the desired bake temperature and while the VOC's are being oxidized by the catalyst, the damper 27 is closed and the damper 33 is opened to exhaust to atmosphere the hot air flow in the path 31 which is not needed to maintain the spray booth air temperature. As necessary, a small controlled amount of the heated air in the path 31 may be provided by modulating the damper 27 to maintain the spray booth air temperature. A make up air damper 35 and a filter 36 are connected upstream from the high capacity blower 25 to provide any needed make up air from an intake duct 37 when the exhaust damper 33 is opened during the bake or cure cycle.

It will be appreciated that only a small fraction of the recirculated spray booth air flows through the path 31. Consequently, VOC's will flow in the path 32 and the main blower 25 will return such VOC's to the spray booth. The dampers may be adjusted so that, for example, about 90% of the air withdrawn from the spray booth 17 is returned to the spray booth 17 and about 10% of the air passes through the path 31 and is exhausted to atmosphere. However, because of the high spray booth air recirculation rate, the VOC's in the spray booth will be quickly reduced to an acceptable level during the heated cure time. Since only a small portion of the air is heated and only a small amount of make up air is needed, the air handling unit 23 has a high energy efficiency. It is more economical to heat a low volume air flow to a higher temperature than to directly heat a high volume air flow to a lower temperature. Further, it is much easier to abate the VOC's in the relatively low air flow in the flow path 31 with a relatively small volume catalyst.

It also should be appreciated that a single small high temperature burner serves two distinct functions. It serves to quickly heat and maintain the temperature in the spray booth 17. It also serves to heat the VOC laden air passed through the catalyst to a sufficient temperature to activate the catalyst 30. The hot air delivered to the spray booth also may serve two purposes. It may heat the painted workpiece to reduce the cure time. Also, it functions to regenerate the adsorbent bed 16 to release the adsorbed VOC's. However, it should be appreciated that it is not necessary to cure the painted workpiece in the spray booth 17. One or more workpieces can be painted in the spray booth 17 and removed for curing elsewhere. Or, a painted vehicle can be left in the spray booth 17 overnight, for example, for curing the paint at room temperature. The temperature in the spray booth 17 may be raised for regenerating the adsorbent bed 16 while no workpiece is present in the spray booth 17.

Figure 5:
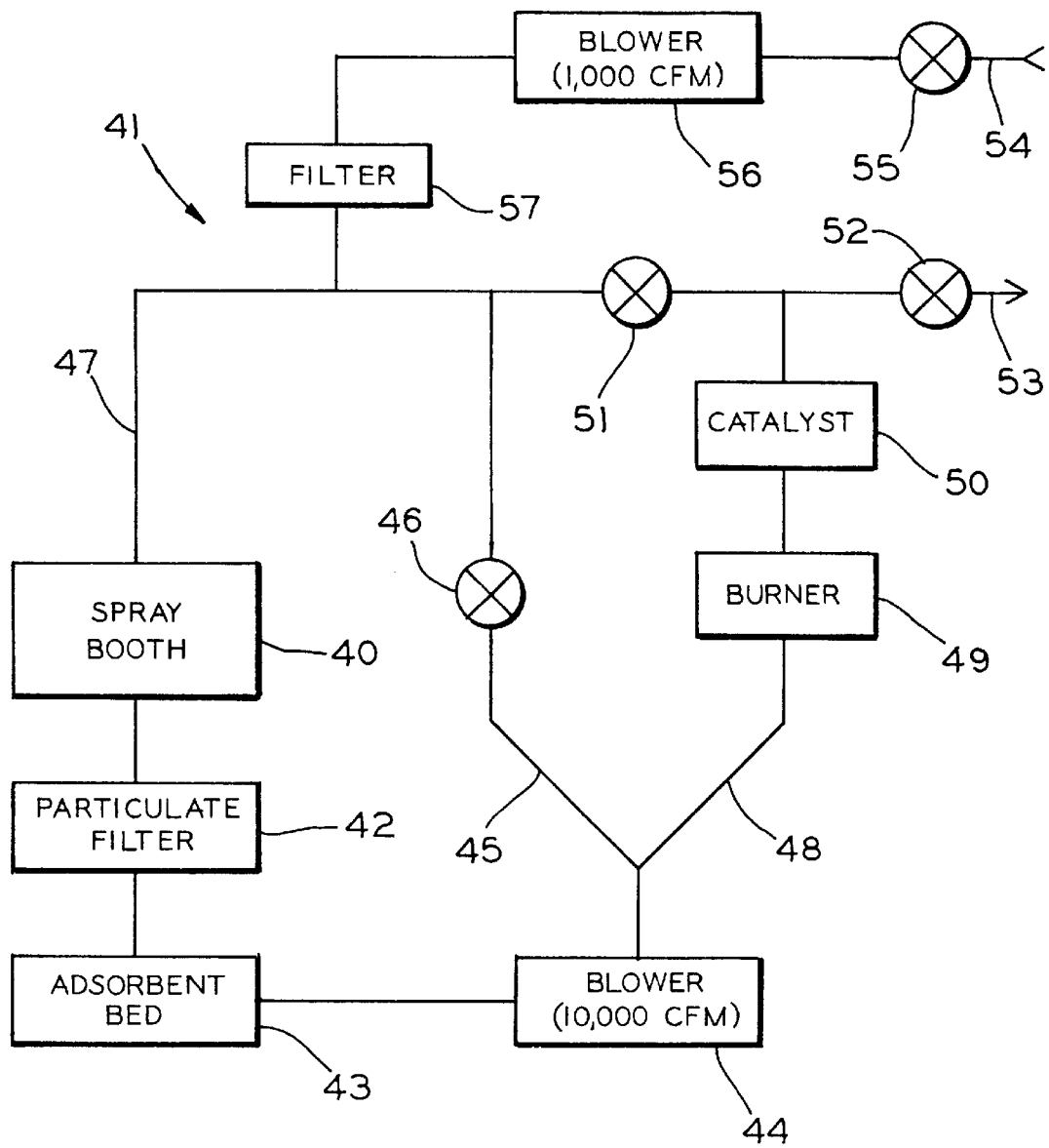
FIG. 5 is a schematic diagram of a modified paint spraying system according to the invention.

FIG. 5 shows a spray booth 40 having an air handling unit 41 according to a modified embodiment of the invention. As with the previously described embodiment, air withdrawn from the spray booth 40 is drawn through a particulate filter 42 and a VOC adsorbent bed 43 which preferably contains a treated desiccant or a similarly functioning VOC adsorbent material which has a low regeneration temperature. The air is drawn from the spray booth 40 by a high capacity blower 44 and is returned to the spray booth 40 through a flow path 45 including a damper 46 and a return air duct 47. The air discharged from the blower 44 also may flow to the return air duct 47 through a path 48 which includes a burner 49, a catalyst 50 and a damper 51. Alternately, air flow from the catalyst 50 may pass through a damper 52 to an exhaust duct 53. An intake air duct 54 is connected through a damper 55, a low capacity blower 56 and a filter 57 to supply make up air to the duct 47, as needed when air is exhausted to the duct 53.

The air handling unit 41 operates in a manner similar to the previously described air handling unit 23. During the spraying cycle, the damper 46 is opened and the dampers 51, 52 and 55 are closed. The blower 44 is operated to draw spray booth air through the particulate filter 42 and the adsorbent bed 43 to remove particulates and VOC's and the air is returned to the spray booth 40. After spraying is completed and while an operator is not present in the spray booth, the damper 51 is opened and the burner 49 is turned on to increase the air temperature in the spray booth. The dampers 46 and 51 may be modulated to provide a desired split in the air flow between the paths 45 and 48. The air flows in the paths 45 and 48 are mixed to achieve a desired temperature and are then returned to the spray booth 40 in the duct 47. Once the desired cure temperature is reached in the spray booth 40, VOC's will be quickly desorbed from the bed 43. At this time, the damper 51 is closed and the damper 52 is opened to exhaust the hot air from the catalyst 50. Once the catalyst 50 is activated by the hot air, an exothermic reaction will take place at the catalyst 50 to oxidize the VOC's. The effluent from the catalyst is vented to atmosphere through the damper 52 and the exhaust duct 53. At the same time, the damper 55 is opened and the blower 56 is operated to supply any needed make up air. The dampers 46, 51, 52 and 55 may be modulated by a programmable controller (not shown) to provide a desired temperature and air pressure balance in the system. The damper 51 may be opened to return a small portion of the hot gases from the catalyst 50 back to the spray booth 40 to maintain the spray booth cure temperature above the VOC desorbent temperature for the bed 43.

Various modifications and changes may be made to the above described preferred embodiments of the invention without departing from the spirit and the scope of the following claims. For example, the specific catalyst used to oxidize the VOC's may be of any known type which will react with the particular VOC's being abated. The VOC adsorbent material should be treated with sufficient water vapor to have a VOC regeneration temperature of no greater than 250° F. (120° C.) for applications in which paint is not being cured and in any event no greater than a safe temperature for the particular application, taking into account any temperatures which will result in a risk of damage or fire. Further, in the broadest aspect of one embodiment of the spray booth, the catalyst may be eliminated and the VOC's may be oxidized by combustion, for example, with the burner 29 or the burner 49. The specified temperatures and air flow rates are intended to be exemplary and may vary with the types of VOC's being abated and with the specific application.

We claim:

1. A method for separating VOC's from a gas comprising the steps of:
    a) treating a water adsorbing desiccant by exposing the water adsorbing desiccant to water vapor, whereby the water adsorbing desiccant becomes at least partially loaded with adsorbed water;
    b) contacting the treated water adsorbing desiccant with gas containing a VOC, whereby the VOC is adsorbed by the treated water adsorbing desiccant; and
    c) desorbing the adsorbed VOC from the treated water adsorbing desiccant by heating the treated water adsorbing desiccant with the adsorbed VOC to no greater than 250° F.

* * * * *